June 10, 1941.  H. H. WOOD  2,245,084

BEARING

Filed Aug. 16, 1939

INVENTOR
HENRY H. WOOD

BY Albert G. Blodgett

ATTORNEY

Patented June 10, 1941

2,245,084

UNITED STATES PATENT OFFICE 2,245,084

BEARING

Henry H. Wood, Pittsburgh, Pa., assignor to Morgan Construction Company, Worcester, Mass., a corporation of Massachusetts Application August 16, 1939, Serial No. 290,459

3 Claims. (Cl. 308—237)

This invention relates to bearings, and more particularly to bearings adapted to support rotating parts such as the necks of rolling mill rolls, which are subjected to heavy radial loads.

It is a common practice to utilize for this purpose bearings of the unit assembly type which can be readily removed from the roll neck when desired, so that the mill rolls can be changed and the same bearings utilized. Such bearings may be of the oil-film type or of the antifriction type, but in either case they usually include an annular inner member or "sleeve" which is mounted on the roll neck to rotate therewith. When the roll neck is formed with a cylindrical surface for contact with the sleeve, as is desirable in some instances, it is necessary to provide a slight radial clearance between these parts in order to facilitate the mounting and removal of the bearing and also to avoid the necessity for extremely close tolerances in the manufacture of the parts. In the operation of the bearing it is found that the sleeve tends to creep slowly around the roll neck, and this produces a rubbing action which results in wear on the parts and particularly on the cylindrical surface of the roll neck. Various attempts have been made to avoid this difficulty by keying the sleeve to the roll neck, but the prior constructions have proven to be unsuccessful when subjected to the test of actual use throughout a long period of hard service.

It is accordingly one object of the invention to provide a radial type bearing arranged to be mounted on a cylindrical inner member and capable of operating without damage to such member throughout a long life of service.

It is a further object of the invention to provide a radial type bearing having an inner sleeve removably mounted on a cylindrical member, with dependable means to prevent relative rotation between these parts despite severe operating conditions and heavy radial loads.

With these and other objects in view, as will be apparent to those skilled in the art, the invention resides in the combination of parts set forth in the specification and covered by the claims appended hereto.

Referring to the drawing illustrating one embodiment of the invention and in which like reference numerals indicate like parts—

Figure 1:
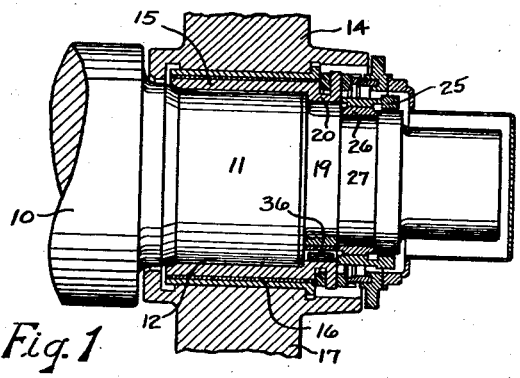
Fig. 1 is a longitudinal section through a bearing mounted on the neck of a rolling mill roll.

The embodiment illustrated in the drawing comprises a rolling mill roll 10 having a roll neck 11 formed with a cylindrical outer surface 12. The roll neck is supported in a bearing 14 of the oil film type disclosed in the prior patent to Dahlstrom No. 2,018,055. This bearing includes an inner sleeve 15 mounted upon the roll neck, and an outer bushing 16 which surrounds the sleeve, the sleeve and bushing being separated by a thin film of oil. The bushing is supported in an outer casing or chuck 17. As shown particularly in Fig. 2, a slight radial clearance is provided between the cylindrical surface 12 of the roll neck and the inner sleeve, to facilitate the mounting of the bearing on the roll neck and its removal therefrom, as well as to avoid the need for manufacturing these parts with extremely close tolerances. Adjacent the outer end of the cylindrical portion 12 the roll neck is reduced in diameter as indicated at 19 (Fig. 1), and the sleeve 15 is formed internally with a wide flange 20 which projects radially inward toward the portion 19, with a slight radial clearance between these parts. With this construction the roll is formed with a shoulder which may be protected by a ring 22 (Fig. 2) having a facing 23 of wear resisting material. The sleeve is held in position on the roll neck by means of a lock nut 25 which is threaded to the usual split threaded ring 26 mounted in a circumferential groove 27 in the roll neck. The lock nut 25 may be provided with a facing 29 of wear resisting material adjacent the outer end of the sleeve.

It will now be apparent that as the roll 10 is rotated a slight relative movement will take place in a radial direction between the sleeve 15 and the roll neck 11. Moreover, there will be a decided tendency for the sleeve to creep slowly about the roll neck in a circumferential direction, and if such creeping does occur there is a serious danger of scoring or otherwise damaging the roll neck and possibly the sleeve. In order to avoid this difficulty I provide means to prevent relative rotation of the sleeve and roll neck without interfering with the relative radial movement of these parts. Several arrangements have been illustrated for this purpose, all of them including an antifriction device adapted to engage opposed shoulders and thereby transmit torque without creating sliding friction which would impede relative radial movement.

Figure 2:
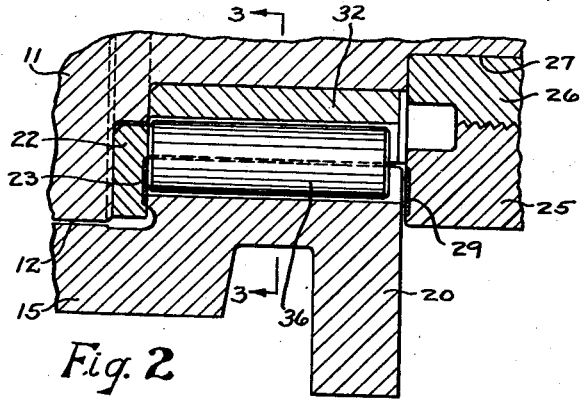
Fig. 2 is an enlarged view of a portion of Fig. 1, shown in section on the line 2—2 of Fig. 3.
Figure 3:
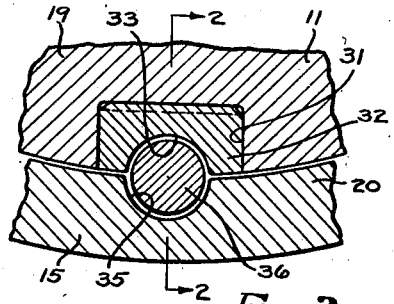
Fig. 3 is a section on the line 3—3 of Fig. 2.

In Figs. 2 and 3 the reduced portion 19 of the roll neck is formed with a keyway 31 in which is staked a key 32 with its outer surface flush with the adjacent outer surface of the roll neck. This key is formed on its outer surface with a central longitudinal semicircular groove 33, and the portion 20 of the sleeve 15 is formed internally with a similarly shaped opposing groove 35. Within the cylindrical opening provided by the two grooves 33 and 35 there is loosely mounted a cylindrical roller 36, the axis of the roller extending parallel with the axis of the roll 10. This roller has a clearance in the opening in a direction radial of the bearing at least as great as the clearance between the roll neck and the sleeve, so that the roller will assume none of the radial load of the bearing. It will be apparent that the grooves 33 and 35 provide opposing concave shoulders which will be engaged by the roller 36, when the apparatus is in operation, to prevent relative rotation of the sleeve and roll neck. It will also be apparent that relative radial movement can take place without interference, since the roller 36 will make line contact with the shoulders and will simply rock slightly thereon. The concave shoulders are desirable, since they reduce the unit pressures and result in less deformation of the parts under load. The roller 36 will operate regardless of the direction of rotation.

Figure 4:
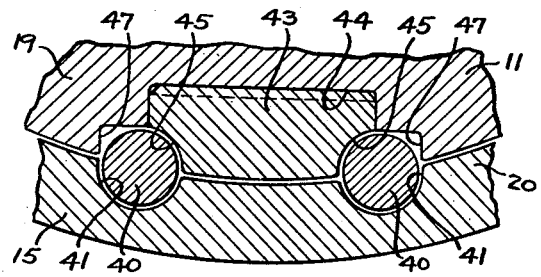
Fig. 4 is a view similar to Fig. 3, showing a modification.

In Fig. 4 I have shown a slight modification in which two loosely mounted rollers 40 are provided, one to operate when the parts rotate in one direction and the other to operate when the parts rotate in the opposite direction. These rollers fit in semicircular grooves 41 in the interior of the sleeve. A key 43 is staked in a keyway 44 in the roll neck, and the two outer corners of the key are formed with concave surfaces 45 providing shoulders for engagement with the respective rollers 40. Recesses 47 are formed in the roll neck at each side of the key to avoid interference with the rollers. It will be apparent that regardless of the direction of rotation, one of the rollers 40 will transmit torque between the roll neck and the sleeve, the roller rocking slightly on the concave shoulders to allow free relative radial movement.

Figure 5:
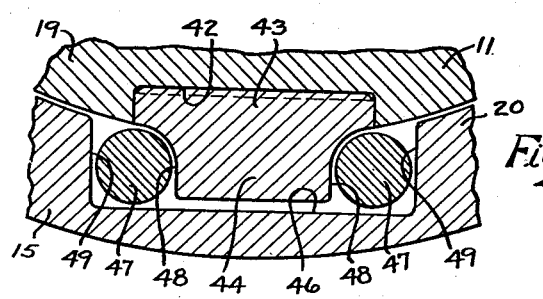
Fig. 5 is a view similar to Fig. 3, showing a further modification.

In Fig. 5 I have shown a further modification in which the roll neck is provided with a keyway 42 having a key 43 staked therein, this key having a portion 44 which projects radially outward beyond the adjacent circumferential surface of the roll neck and into an enlarged substantially rectangular recess 46 in the interior of the sleeve. Within this recess 46 and on opposite sides of the projecting portion 44 are two cylindrical rollers 47. It will be apparent that the sides 48 of the portion 44 and the sides 49 of the recess 46 provide opposing shoulders adapted to be rockingly contacted by one or the other of the rollers 47, depending upon the direction of rotation. Thus one of the rollers will transmit torque and at the same time allow free relative movement of the parts radially.

Having thus described my invention, what I claim as new and desire to secure by Letters Patent is:

1. A bearing comprising an inner member having a cylindrical outer surface, a sleeve surrounding said member with a slight radial clearance and removable therefrom in an axial direction, the inner member and the sleeve being shaped to provide an opening between them having two opposed shoulders, a cylindrical roller mounted within the opening with its axis parallel with the axis of the inner member, the roller having a clearance in the opening in a direction radial of the bearing at least as great as the clearance between the inner member and the sleeve so that the roller will assume none of the radial load of the bearing, the roller being arranged to make line contact with each of said shoulders and to rock thereon as relative radial movement occurs between the sleeve and inner member, and outer bearing means surrounding the sleeve.

2. In combination with a rotatable element having a cylindrical outer surface, a key fixed to said element, a sleeve surrounding the element and key with a slight radial clearance from the said cylindrical surface and removable therefrom in an axial direction, the key and the sleeve being shaped to provide an opening between them having two opposed shoulders, a cylindrical roller mounted within the opening with its axis parallel with the axis of the rotatable element, the roller having a clearance in the opening in a direction radial of the bearing at least as great as the clearance between the rotatable element and the sleeve so that the roller will assume none of the radial load of the bearing, the roller being arranged to make line contact with each of said shoulders and to rock thereon as relative radial movement occurs between the sleeve and the rotatable element, and outer bearing means surrounding the sleeve.

3. A bearing comprising an inner member having a cylindrical outer surface, a sleeve surrounding said member with a slight radial clearance and removable therefrom in an axial direction, the inner member and the sleeve being shaped to provide an opening between them having two opposed shoulders, a device mounted within the opening and engaging the shoulders to prevent relative rotation of the inner member and sleeve, the device having a clearance in the opening in a direction radial of the bearing at least as great as the clearance between the inner member and the sleeve so that the device will assume none of the radial load of the bearing, the device being arranged to rock slightly on the said shoulders as relative radial movement occurs between the inner member and the sleeve, and outer bearing means surrounding the sleeve.

HENRY H. WOOD.